UNITED STATES PATENT OFFICE.

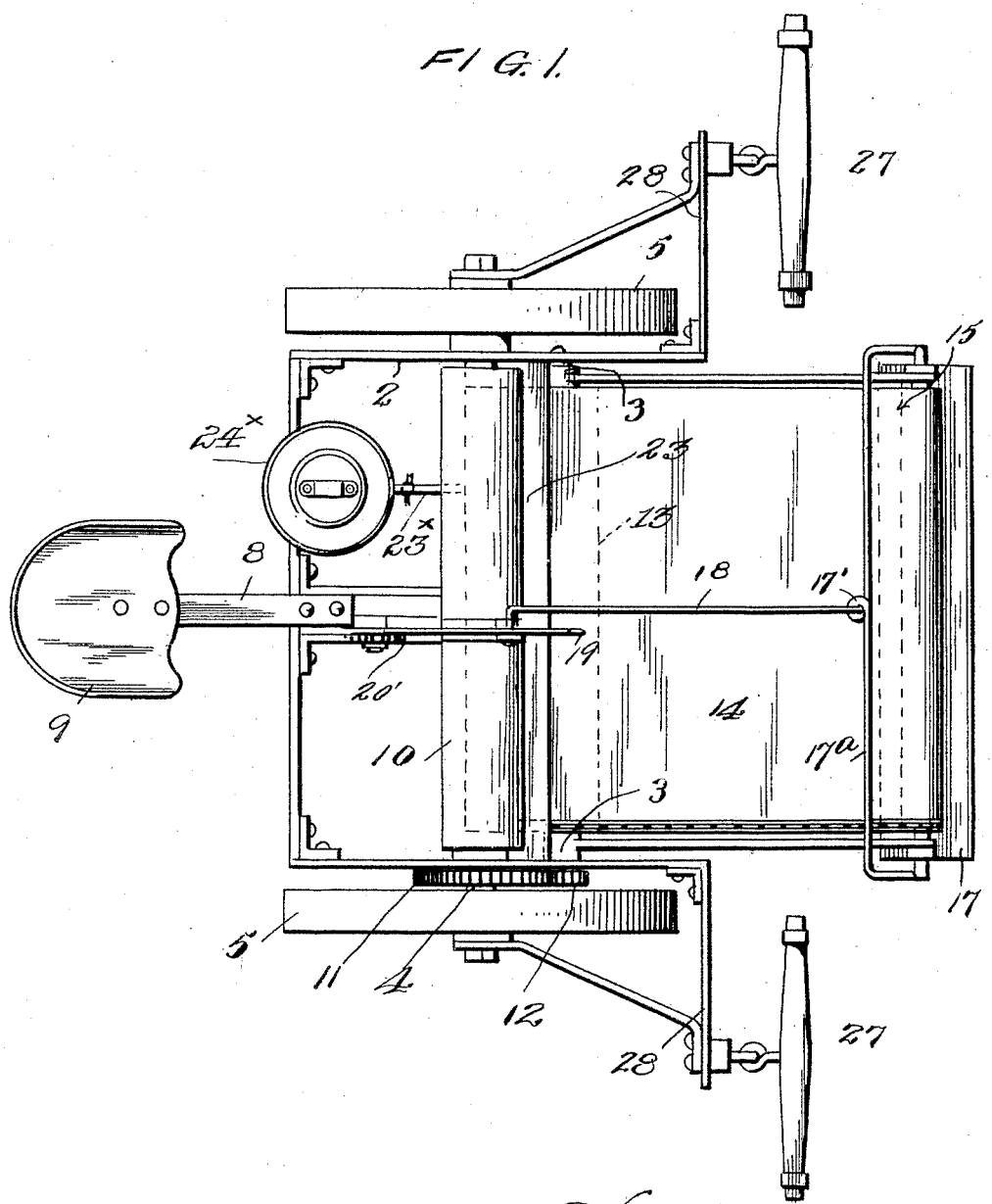

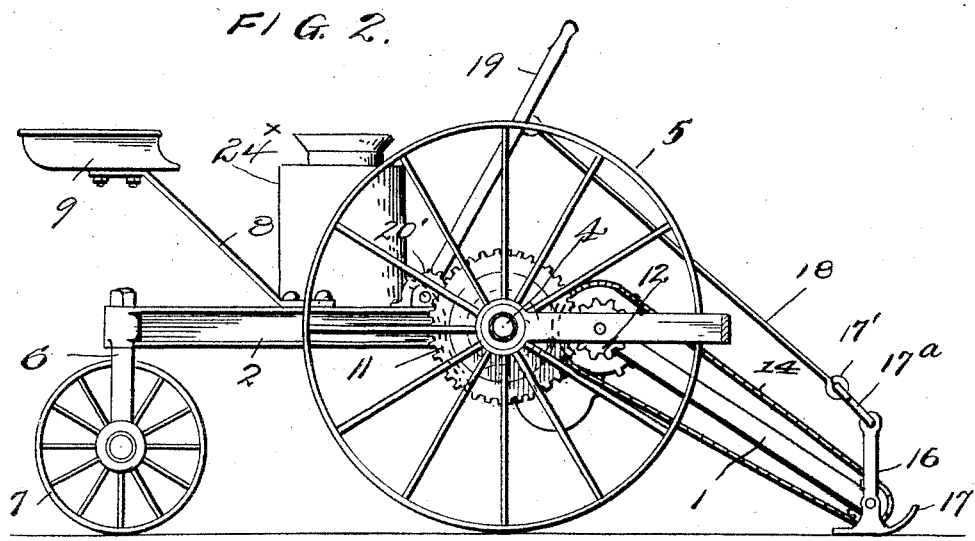

HENRY M. SIEMAN, OF FORT LUPTON, COLORADO.

GRASSHOPPER-DESTROYER.

1,068,177.  Specification of Letters Patent.  Patented July 22, 1913.

Application filed December 4, 1911. Serial No. 663,749.

*To all whom it may concern:*

Be it known that I, HENRY M. SIEMAN, a citizen of the United States, residing at Fort Lupton, in the county of Weld and State of Colorado, have invented certain new and useful Improvements in Grasshopper-Destroyers, of which the following is a specification.

My invention relates to improvements in grasshopper destroyers and has particular reference to a machine adapted to mechanically destroy the grasshoppers with which it contacts.

The leading object of my invention is the provision of an improved machine which will serve to catch the grasshoppers as they fly through the air toward the machine and which will positively destroy the same and will spread the bodies thereof evenly over the field to fertilize the soil.

Another object of the invention is the provision of a machine of simple, inexpensive and practical construction adapted to be moved through a field infested with grasshoppers, which will serve to catch a portion of the grasshoppers and pulverize the same and which will then poison the crushed mass to provide an acceptable poisoned food for the remaining grasshoppers which will not be palatable to, or attract cattle or other stock as most grasshopper poisons now in use are liable to do.

To attain the desired objects, my invention comprises a frame having supporting wheels, crushing mechanism and poisoning and mixing-distributing mechanism also driven by the wheels, and means mounted on the frame for catching and feeding the grasshoppers into the mechanism; the invention further residing in the novel features of construction and combination and arrangement of parts for service, substantially as described and as illustrated in the accompanying drawings, in which—

Figure 1 represents a top plan view of my complete machine. Fig. 2 represents a side elevation thereof, and Fig. 3 represents a vertical sectional view of the crushing, poisoning, and distributing mechanisms.

In the drawings: The numeral 1 denotes the frame bars providing the rectangular lower frame, while supported thereabove are the bars 2, providing a second frame, while a bearing 3 is interposed and secured between the forward ends of said frames 1 and 2 on each side. Journaled in each of said bearings and extending across the machine is the axle shaft 4 having secured on each end the large supporting wheels 5, while pivoted to the rear of the frame is the bracket 6, in which is mounted the smaller or caster wheel 7 for balancing the machine. Supported by the frame bars 2 is the extension 8 to which is secured the driver's seat 9.

Mounted on the shaft 4 is the crushing roller 10, having secured at one end the gear 11, which is in mesh with the gear 12 of the roller 13, which has its shaft 14' journaled in the other half of the double bearing 3, and it will be understood that while the roller 10 is driven forward as the machine moves, the gears will drive the roller 13 in a reverse direction and said rollers will draw down between and crush any small substances resting on their upper surface.

The numeral 14 denotes the carrier apron having its rear end passing over the roller 13 and its forward end passing over roller 15, journaled in the uprights 16. These uprights 16 are provided with the upwardly projecting shoe 17, which assembles the grasshoppers and directs them upon the carrier apron 14. To the upper end of the uprights 16 is secured the bail 17$^a$ having a central eye 17', to receive the lower end of link 18, which has its upper end connected to the operating lever 19, provided with the usual dog (not shown) engaging the rack 20', mounted on the longitudinal bars of the frame 2. From this construction, it will be noted that the apron is driven from the ground wheels by means of the inter-meshing gears and that to raise the shoe and apron, it is simply necessary to move the lever 19. In this manner, the grasshoppers are caught by the shoe and carried along the apron to the center of the machine, where my improved mechanism for crushing and poisoning the insects is located. The mechanism for crushing the insects thus delivered by the apron consists of the roller 10, which as before stated, is mounted upon the shaft or axle 4, and is disposed in a plane slightly elevated with respect to the roller 13, while located beneath said roller and in contact with said roller is the roller 20, which is provided with a semi-circular housing or hood forming the trough 22 therebeneath, which through a pipe 23$^\times$ receives the poison from the supply tank 24$^\times$, mounted on the frame. The trough 22 is suspended from the frame bars 2 by means of the curved braces 25ˣ, indicated in dotted lines, Fig. 2.

To remove and guide the insects delivered from the apron 14 between the crushing rollers 10 and 20, I provide the triangular shaped guiding and scraping device 23, which is supported upon the poison trough by means of the arms 26ˣ. The scraper 23 has its base disposed in such a manner as to form a bridging element between that point on the periphery of the roller 13 where the insects begin their descent from the roller to that point on the periphery of the roller 20 where the rollers 10 and 20 are substantially tangent. This guiding and scraping device 23 has its curved sides 24 and 25 contacting with the respective adjacent portions of the rollers 13 and 20 and thus acts as a scraper to prevent the accumulation of crushed bodies upon the rollers. Thus it will be seen that the insects are first assembled by the shoe, are delivered to the roller 13 by means of the apron 14, and at this point the base of the communicating device 23 removes the insects from the apron 14, and guides them across the intervening space between rollers 13 and 20 to the approximately contacting peripheries of rollers 10 and 20, where they are crushed and delivered into the trough 22. This trough is filled with a poisonous mixture and in it the crushed bodies of the insects are submerged. The poison-impregnated bodies are thus carried through the poison-laden trough 22 by the revolution of the roller 20 and are finally delivered through delivery opening 26 out upon the field to be eaten by the remaining grasshoppers.

From this construction, it will be seen that the insects are readily caught, crushed and impregnated with poison and discharged from the machine, which is drawn through the infested field by means of horses attached to the swingle trees 27 carried by the lateral brackets 28, and furthermore that the poisoned mass of discharged insects will not attract stock grazing in the field, as grasshopper poison oftentimes does when merely distributed in the fields.

Considerable importance is attached to the triangular configuration of the scraper member, as one side 24 contacts with and cleans crusher roller 20′, another side 25 contacts with and cleans carrier apron 14′, and the third side or base 23 forms the bridge between the apron 14′ and the pair of crusher rollers 10 and 20′. The utility of this arrangement is apparent when it is considered that were the scraper in the form of a thin plate only the carrier apron could be cleaned, and an independent scraper would be necessary for the advantageous operation of the lower crusher roller 20′.

I claim:

An insect destroyer comprising in combination with a wheeled frame, a pair of driven crusher rollers mounted on said frame, means for positively driving said rollers, a catcher discharging onto said rollers, a single element interposed between the catcher and the adjacent crusher roller and having two sides following the contour of said catcher and roller and its upper side inclinedly extending to a point between the crushing rollers, and a poison trough beneath the lower crusher roller to receive the crushed material, said trough following the contour of the roller whereby the crushed mass is discharged from the trough by reason of the revolution of said roller.

In testimony whereof I affix my signature in presence of two witnesses.

HENRY M. SIEMAN.

Witnesses:
  GEORGE W. BUTLER,
  AUGUST SCHMIDT.

---

Copies of this patent may be obtained for five cents each, by addressing the "Commissioner of Patents, Washington, D. C."